Feb. 14, 1950 — J. R. RUMBAUGH — 2,497,139
ORIFICE FITTING
Filed July 16, 1946
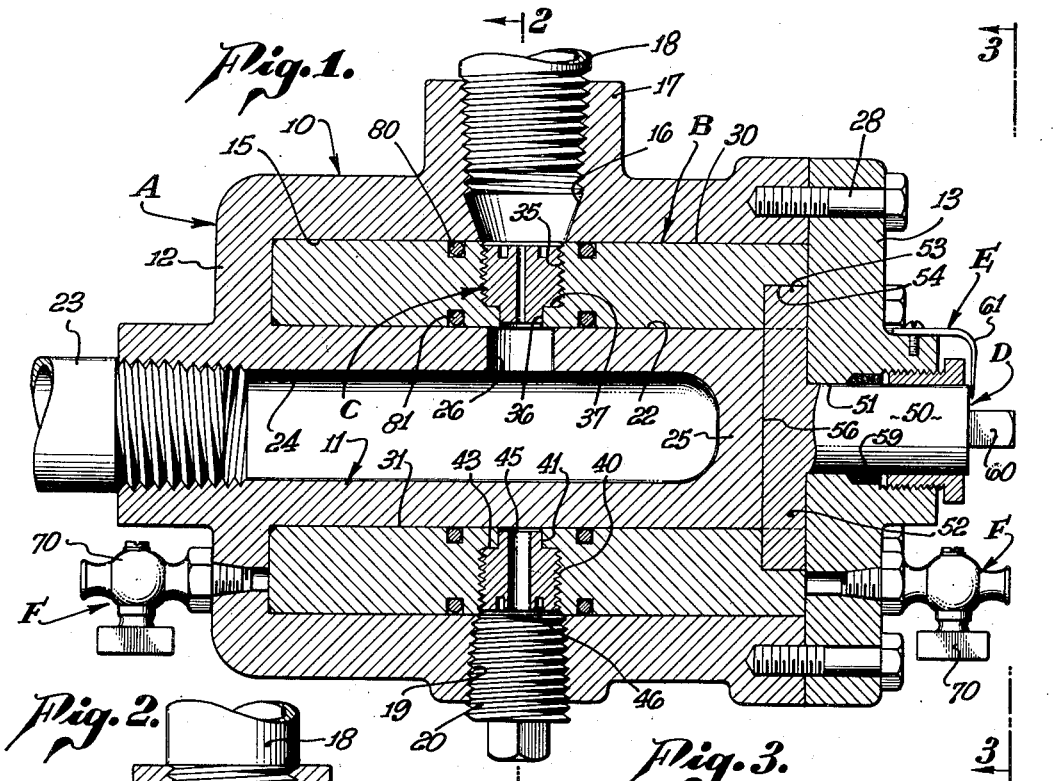
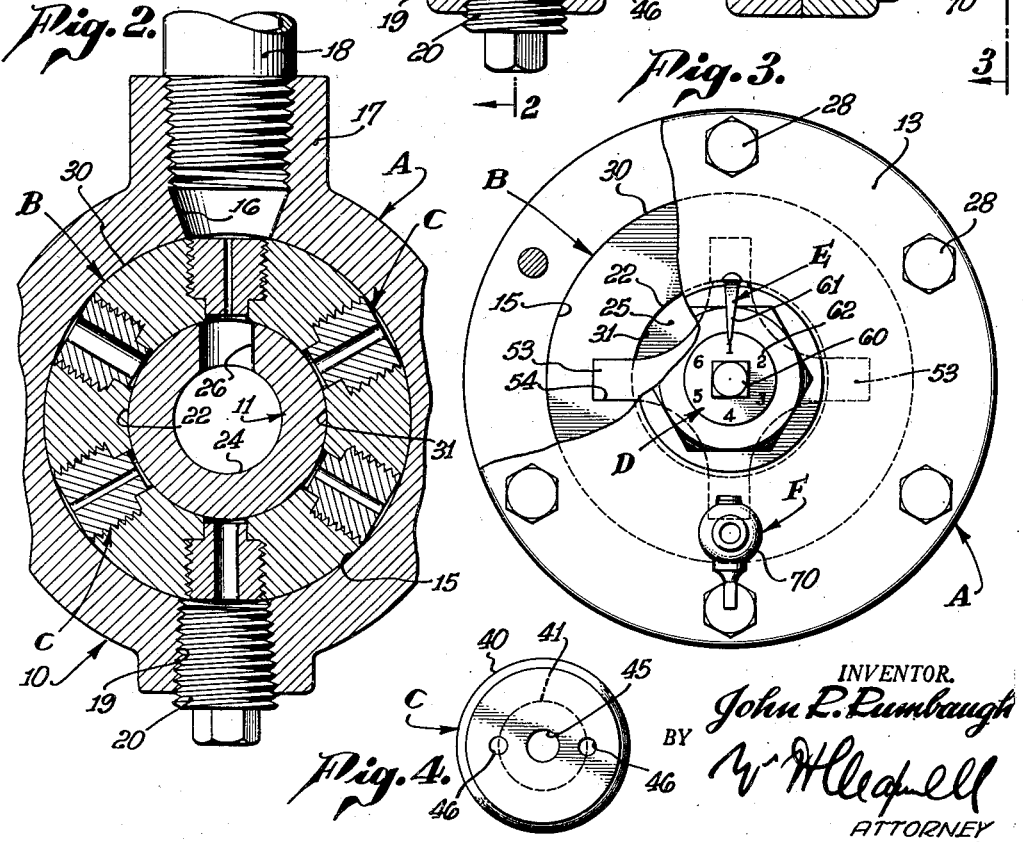
INVENTOR.
John R. Rumbaugh
BY
W. H. Cadwell
ATTORNEY Patented Feb. 14, 1950

2,497,139

UNITED STATES PATENT OFFICE 2,497,139

ORIFICE FITTING

John R. Rumbaugh, Los Angeles, Calif.

Application July 16, 1946, Serial No. 684,015

17 Claims. (Cl. 138—46)

This invention relates to an orifice fitting and it is a general object of the present invention to provide a single, effective and practical orifice fitting suitable for use in controlling flow of fluids in general and which is particularly useful in controlling flow from oil wells.

Orifice fittings or flow control devices are employed in connection with flowing wells and such devices commonly involve beans through which the flow occurs. The degree of regulation or control is governed by the aperture in the bean and it is generally necessary to renew the beans at frequent intervals since they usually wear rapidly. In practice it is sometimes necessary to change or renew the beans at relatively frequent intervals in order to modify the degree of flow regulation, or to replace or renew the beans which may have become enlarged or cut out by sand produced with the oil.

It is a general object of the present invention to provide an orifice fitting which is of simple, practical form and in which the few parts that are involved are arranged and related to form a practical, effective, easily operated device. With my construction the parts are so arranged and related as to eliminate the usual practice of by passing the fluid flow around the controlling device while effecting a change in control or a renewal of parts.

A general object of the present invention is to provide an orifice fitting involving a body which defines an elongate tubular cavity or chamber in which an orifice sleeve operates. In the construction that I have provided the tubular chamber is defined by two body sections, one an outer shell and the other a core spaced within the shell.

A further object of the present invention is to provide an orifice fitting in which the sleeve carries circumferentially spaced removable beans or orifice plugs and the shell has a flow handling opening and an access opening.

It is another object of the invention to provide an orifice fitting of the general character referred to in which the core of the body is closed at one end and open at the other and serves as a flow handling element.

It is a further object of the present invention to provide an orifice fitting of the general character referred to which includes a simple, practical, and dependable operating means for the sleeve whereby it can be rotated to change its position in the body.

The various objects and features of my invention will be fully understood from the following detailed description of a typical preferred form and application of the invention, throughout which description reference is made to the accompanying drawings, in which:

Fig. 1 is a longitudinal detailed sectional view of the fitting that I have provided. Fig. 2 is a detailed transverse sectional view of the fitting being a view taken as indicated by line 2—2 on Fig. 1. Fig. 3 is an end view of the fitting being a view taken as indicated by line 3—3 on Fig. 1, and Fig. 4 is an enlarged end view of one of the orifice plugs employed in the device.

The orifice fitting that I have provided involves, generally, a body A, a sleeve B carried in the body, orifice plugs or beans C carried by the sleeve, operating means D for the sleeve, indicating means E in connection with the means D, and drain means F.

The body A involves, generally, two tubular sections 10 and 11 joined at their ends by heads 12 and 13. The section 10 is an outer section which I will term a shell, while the section 11 is an inner section which I will term a core.

The shell 10 of the body is a simple, tubular part having a central or longitudinal opening in the nature of a bore 15 finished to have a straight cylindrical wall of uniform or substantially uniform diameter from one end of the shell to the other. The exterior of the shell 10 may be of any suitable form or shape. For example it may follow the general contour of the interior, exterior, except that it is generally desirable to provide it with suitable bosses as appear in the drawings.

The shell 10 is provided with a flow handling opening 16 which extends through the wall of the shell at a point intermediate the ends thereof. The opening 16 communicates with the bore 15 and extends through a suitable boss 17 provided on the exterior of the shell, the boss being suitable for the reception of a flow handling line or pipe 18 that may be connected with the fitting. The shell 10 is further provided with one or more access openings 19 providing access from the exterior of the shell to the bore 15 thereof. In the case illustrated I have shown one access opening and I have shown it located diametrically opposite the flow handling opening 16. The access opening is normally closed or sealed by a plug 20 or other suitable closure which can be readily removed when it is desired to use the access opening.

The inner section or core 11 of the body A is a simple, tubular part having its outer surface 22 turned and finished to be straight or substantially straight and smooth and the core is arranged in the shell so that the exterior 22 thereof is concentric with the bore 15 of the shell. In the preferred arrangement one end, which I will term the outer end of the core, may be extended somewhat beyond the corresponding end of the shell to receive a flow handling line or pipe 23 and the core has an opening preferably a central opening 24 extending longitudinally through it to a point inward of or beyond the plane in which the body openings 16 and 19 occur. The inner end of the core is closed by a wall 25 so that if the fitting is used so that flow enters through pipe 23 the core of the body acts like a bull plug. The core 11 of the body A is provided with a flow handling opening 26 opposite or in line with the flow handling opening 16 of the shell 10.

A feature of my present construction is the location of the core 11 in the shell 10 so that a tubular chamber is formed between these elements and I prefer that the shell and core be fixed or rigidly connected in this desired relationship. The chamber is a straight or substantially straight tubular opening or cavity. In the construction illustrated the shell and core are held in the desired concentric spaced relationship by the head 12 which is located at one end of the body and which is rigidly joined or coupled to both the shell and the core. In the drawings I have shown the head 12 integrally joined to the shell and core.

The head 13 is provided to close the other end of the body and is in the nature of a removable plate secured to the other body parts by suitable fastening devices 28. In the particular case illustrated the fastening devices are screw members which join the head 13 to the end of the shell 10.

The sleeve B that I provide is a simple tubular element having its exterior or outer surface 30 turned and finished to seat in the bore 15 of shell 10 and having its interior or bore 31 finished to seat on the exterior or outer surface 22 of core 11. The sleeve B is of such length as to extend between the heads 12 and 13 so that these elements serve to confine the sleeve against axial movement. The sleeve B shaped and proportioned as I have explained occupies the tubular chamber formed by the body elements 10 and 11.

In accordance with my invention I provide the sleeve B with a plurality of radial ports which serve to carry the orifice plugs C. These ports are located lengthwise of the fitting to be in line with the openings provided in the shell and core and they are circumferentially spaced around the sleeve. In the case illustrated I have shown six ports in the sleeve equally spaced around the sleeve it being understood that I may, in practice, provide any suitable number of ports and that they may be spaced in any suitable manner. It is preferred, however, that the spacing of the ports in the sleeve be such that when one port registers with the flow opening 16 of the shell 10 another is in register with the access opening 19 of the shell. In the case illustrated each port is formed so that it has a large outer end portion 35 which is threaded and has a small or reduced inner end portion 36 which is concentric with the threaded portion 35. When the port is thus formed of portions with different diameters it has an outwardly facing shoulder 37.

In practice the several ports provided in the sleeve may vary in size and character. However, I prefer to make them uniform as I have shown throughout the drawings.

It is preferred in practice to so fit the sleeve into the shell 10 and onto the core 11 that there is no leakage lengthwise of the sleeve. However, as a guard against such leakage I prefer to provide annular packers 80 around the sleeve toward each end of the sleeve from the ports and also similar packers 81 within the sleeve toward each end of the sleeve from the ports. The packers 80 are such as to engage outwardly in the bore 15 and thus establish a seal between the sleeve and the shell while the packers 81 engage the surface 22 of the core and thus seal between the sleeve and the core.

The beans or orifice plugs C are carried in the ports provided in the sleeve B and each plug is such as to be arranged in a port to be confined in the sleeve so that it does not in any way interfere with rotation of the sleeve in the body. With the sleeve provided with ports, as above described, each plug C has a large outer portion 40 threaded to engage in the port portion 35 and has a reduced port portion 36. The plug has a shoulder 43 which seats tightly on the shoulder 37 in the port. Each plug C has one or more flow handling passages or apertures 45, it being preferred, ordinarily, to provide each plug with one central aperture 45, as I have shown throughout the drawings. It will be understood that plugs can be employed in the fitting having apertures of any desired size and in any particular case all of the plugs handled at any one particular time may be of different or varied sizes or they may be uniform as to size as circumstances require.

The outer end portion of each plug C is made such that it can be readily engaged by a wrench or operating tool so that it can be applied to and removed from the port in the sleeve B. In the case illustrated I have shown each plug provided at its outer end with wrench sockets 46.

The operating means D provided for the sleeve B involves, generally, a longitudinally disposed central stem 50 rotatably supported in the central opening 51 formed through one head of the body. In the case illustrated the opening 51 is in the head 13 of the body so that the stem occurs at the end of the body opposite to that to which the pipe 23 is connected. Suitable packing means 59 is provided between the stem and the head which has the stem carrying opening 51. The stem is provided at its inner end or immediately inside the head 13 with an enlargement 52 having radially projecting fingers 53 which engage in notches 54 in the sleeve B. Through this construction the stem 50 is locked to the sleeve B to have driving engagement therewith so that the sleeve turns with the stem. It is to be observed that the enlargement 52 on the stem 50 is a plate-like part occupying the space in the body between the inner side of head 13 and the inner end 56 of the core 11.

The stem 50 of the operating means D is adapted to be engaged at the exterior of the fitting to facilitate turning of the sleeve when desired. In the case illustrated I have shown the stem 50 provided at its outer end with a polygonal part 60 that can be readily engaged by means of a wrench or other suitable operating tool.

The indicating means E that I have provided enables the operator to readily determine the rotative position of the sleeve B in the body A. In the case illustrated I have shown a pointer 61 fixed to the body, that is to the head 13 of the body, and I have shown reference marks 62 on the stem 50 forming a scale on the stem. The reference marks are preferably rotated to correspond in location with the ports in the sleeve that carry the orifice plugs so that when a reference mark 62 is in line with the pointer 61 a plug is in line with openings 16 and 26. It will be apparent that by employing numerals or the like for the reference marks 62 the operator can determine just which plug C is in operating position at any particular time.

The drain means F that I have provided is arranged in connection with the body A and may involve a drain cock 70 at each end of the body so that any leakage that may occur between the body parts and the sleeve reaching the ends of the sleeve can be readily drained from the fitting, if desired. It will be noted that I have shown a drain cock 70 in each head of the body.

With the construction that I have provided the parts to be accurately fitted together are such that they can be easily machined and fitted and when the fitting is assembled or in operating condition, as shown in the drawings, the sleeve B is rotatably supported in the body and can be readily rotated whenever desired by suitable operation of the means D. Normally the sleeve will be turned to a position where one of the orifice plugs is in line with or registers with openings 16 and 26 so that there is a flow passage or opening through the fitting, the size of such passage being determined by the size of the opening 45 through the particular plug thus in register between the openings 16 and 26. With my preferred arrangement, when one plug is in operating position, as above described, another of the plugs is in register with the access opening 19 and it can be removed and renewed, repaired or replaced, as circumstances may require, by simply removing the plug 20 and manipulating it by a suitable tool engaged in the sockets 46. It will be apparent that with my construction the orifice plugs can be successively brought into operation as may be required and that they can be repaired or replaced without taking the fitting out of service.

When I refer to the essential working parts such as the shell, the sleeve and the core as being "straight" or "tubular" I mean to include structure that is not only truly straight or tubular but which is slightly tapered. Because of the presence of foreign matter such as sand, and for other obvious reasons I may provide a slight taper between the sleeve and shell and between the sleeve and core so that the sleeve can be worked lengthwise to free it if this becomes necessary, but I do not propose to use the sort of taper that is employed in plug valves or the like, rather I prefer that the parts be as near straight or truly tubular as possible.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A fitting of the character described including a body having inner and outer concentric walls defining a tubular chamber, there being a plurality of ports circumferentially spaced in one wall and a port in the other wall, and a sleeve rotatable in the chamber and having a plurality of ports extending laterally therethrough and located to cooperate with the ports in the walls of the body.

2. A fitting of the character described including, a body having inner and outer concentric walls defining a tubular chamber, there being a plurality of ports circumferentially spaced in one wall and a port in the other wall, and a sleeve rotatable in the chamber and having a plurality of lateral ports therethrough and located to cooperate with the ports in the walls of the body, the body having heads closing the ends of the chamber and confining the sleeve therein.

3. A fitting of the character described including, a body having concentric inner and outer walls defining a tubular chamber, there being a plurality of ports circumferentially spaced in one wall and a port in the other wall, and a sleeve rotatable in the chamber and having a plurality of lateral ports therethrough located to cooperate with the ports in the walls of the body, there being removable orifice plugs in ports in the sleeve confined between the inner and outer surfaces of the sleeve.

4. A fitting of the character described including, a body having concentric inner and outer walls defining a tubular chamber, there being a plurality of ports circumferentially spaced in one wall and a port in the other wall, a sleeve rotatable in the chamber and having a plurality of ports therethrough located to cooperate with the ports in the walls of the body, the body having heads closing the ends of the chamber and confining the sleeve therein, and drain means at the ends of the chamber.

5. A fitting of the character described including, a body having concentric walls defining a tubular chamber, there being a plurality of ports circumferentially spaced in one wall and a port in the other wall, a sleeve rotatable in the chamber and having a plurality of lateral ports located to cooperate with the ports in the walls of the body, the body having heads closing the ends of the chamber and confining the sleeve therein, and means for rotating the sleeve including a stem extending through one head and having an enlargement at the inner side of said head engaging the sleeve.

6. A fitting of the character described including, a body including two concentric sections one a shell with a finished cylindrical bore, the other a core with a finished round outer wall spaced from the shell leaving a tubular chamber therebetween and heads closing the ends of the chamber, there being a flow opening in one section communicating with the chamber and an access opening in said section communicating with the chamber and circumferentially spaced from the flow opening and there being a flow opening in the other section communicating with the chamber, and a sleeve rotatable in the chamber seated in the cylindrical bore and on the said wall and having a plurality of ports cooperating with the openings in the two sections of the body.

7. A fitting of the character described including, a body including two concentric sections one a shell with a finished cylindrical bore, the other a core with a finished round outer wall spaced from the shell leaving a tubular chamber therebetween and heads closing the ends of the chamber, there being a flow opening in one section communicating with the chamber and an access opening in said section communicating with the chamber and circumferentially spaced from the flow opening and there being a flow opening in the other section communicating with the chamber, and a sleeve rotatable in the chamber seated in the cylindrical bore and on the said wall and having a plurality of ports cooperating with the openings in the two sections of the body, each port having a flow controlling plug supported therein and removable therefrom through the access opening upon being positioned in register therewith.

8. A fitting of the character described including, a body including two concentric sections one a shell with a finished cylindrical bore the other a core with a finished round outer wall spaced from the shell leaving a tubular chamber therebetween and heads closing the ends of the chamber, one of the heads being permanently joined to the shell and core and the other being detachable from the shell and core, there being a flow opening in one section communicating with the chamber and an access opening in said section communicating with the chamber and circumferentially spaced from the flow opening and there being a flow opening in the other section communicating with the chamber, and a sleeve rotatable in the chamber seated in the cylindrical bore and on the said wall and having a plurality of ports cooperating with the openings in the two sections of the body.

9. A fitting of the character described including, a body including two concentric sections one a shell with a finished cylindrical bore, the other a core with a finished round outer wall spaced from the shell leaving a tubular chamber therebetween and heads closing the ends of the chamber, there being a flow opening in one section communicating with the chamber and an access opening in said section communicating with the chamber and circumferentially spaced from the flow opening and there being a flow opening in the other section communicating with the chamber, and a sleeve rotatable in the chamber seated in the cylindrical bore and on the said wall and having a plurality of ports cooperating with the openings in the two sections of the body, each port having a flow controlling plug supported therein and removable therefrom through the access opening upon being positioned in register therewith, each port having an outwardly facing shoulder therein and each plug having a shoulder seating on a port shoulder.

10. A fitting of the character described including, a body including two concentric sections one a shell with a finished cylindrical bore the other a core with a finished round outer wall spaced from the shell leaving a tubular chamber therebetween and heads closing the ends of the chamber, there being a flow opening in one section communicating with the chamber and an access opening in said section communicating with the chamber and circumferentially spaced from the flow opening and there being a flow opening in the other section communicating with the chamber, a sleeve rotatable in the chamber seated in the cylindrical bore and on the said wall and having a plurality of ports cooperating with the openings in the two sections of the body, and sealing means in and around the sleeve in each direction along the sleeve from the ports.

11. A fitting of the character described including, a body including a shell having a bore, a core in the bore and having a turned exterior spaced from the wall of the bore and concentric therewith, and heads closing the ends of the tubular chamber defined between the core and shell, there being a flow opening in the shell and a flow opening in the core in line with the opening in the shell radially of the body, the shell having an access opening with a removable closure, a sleeve rotatably carried in said chamber and having a plurality of ports movable into register with the openings, and orifice plugs removably mounted in the ports.

12. A fitting of the character described including, a body including a shell having a bore, a core in the bore and having a turned exterior spaced from the wall of the bore and concentric therewith, and heads closing the ends of the tubular chamber between the core and shell, there being a flow opening in the shell and a flow opening in the core in line with the opening in the shell radially of the body, the shell having an access opening with a removable closure, a sleeve rotatably carried in said chamber and having a plurality of ports movable into register with the openings, and orifice plugs removably mounted in the ports, the core being tubular and open at one end to pass fluid and closed at the other end.

13. A fitting of the character described including, a body having a shell with a bore, a tubular core arranged centrally in the shell with an open outer end projecting from one end of the shell and a closed inner end terminating in the shell, a head rigidly joining the shell and core at the outer end portion of the core, and a removable head at the other end of the shell and core, there being aligned flow openings in the shell and core and there being an access opening in the shell normally closed by a removable plug, a tubular sleeve confined between the heads and bearing in the bore and on the core and having a plurality of circumferentially spaced ports movable into and out of register with said openings, and orifice plugs carried in the ports.

14. A fitting of the character described including, a body having a shell with a bore, a tubular core arranged centrally in the shell with an open outer end projecting from one end of the shell and a closed inner end terminating in the shell, a head rigidly joining the shell and core at the outer end portion of the core, and a removable head at the other end of the shell and core, there being aligned flow openings in the shell and core and there being an access opening in the shell normally closed by a removable plug, a tubular sleeve confined between the heads and bearing in the bore and on the core and having a plurality of circumferentially spaced ports movable into and out of register with said openings, orifice plugs carried in the ports, and operating means for the sleeve including a stem carried in the last mentioned head and having a part between the inner side of said head and the inner end of the core and engaging the sleeve.

15. A fitting of the character described including, a shell with a cylindrical bore, a core in the shell with a round outer wall spaced from the shell leaving a tubular chamber therebetween, heads closing the ends of the chamber, there being a flow opening in the shell communicating with the chamber and an access opening in the shell communicating with the chamber and circumferentially spaced from the flow opening, the core having a central passage entering it from one end and having a lateral opening from the said passage to the chamber, and a sleeve rotatable in the bore and around the core and having a plurality of ports cooperating with the openings in the shell and core.

16. A fitting of the character described including, a shell with a cylindrical bore, a core in the shell with a round outer wall spaced from the shell leaving a tubular chamber therebetween, heads closing the ends of the chamber, there being a flow opening in the shell communicating with the chamber and an access opening in the shell communicating with the chamber and circumferentially spaced from the flow opening, the core having a central passage entering it from one end of the structure and having a lateral opening from the said passage to the chamber, and a sleeve rotatable in the bore and around the core and having a plurality of ports cooperating with the openings in the shell and core, and an operator engaged with the sleeve for rotating the sleeve and accessible at the other end of the structure.

17. A fitting of the character described including, a shell with a cylindrical bore, a core in the shell with a round outer wall spaced from the shell leaving a tubular chamber therebetween, heads closing the ends of the chamber, there being a flow opening in the shell communicating with the chamber and an access opening in the shell communicating with the chamber and circumferentially spaced from the flow opening, the core having a central passage entering it from one end of the structure and having a lateral opening from the said passage to the chamber, and a sleeve rotatable in the bore and around the core and having a plurality of ports cooperating with the openings in the shell and core, and an operator engaged with the sleeve for rotating the sleeve and accessible at the other end of the structure, one of said heads being located at the first mentioned end of the structure and being integrally joined with the shell and core and the other head being located at the said other end of the structure and being separable from both the shell and the core.

JOHN R. RUMBAUGH.

REFERENCES CITED

The following references are of record in the file of this patent:

UNITED STATES PATENTS

| Number | Name | Date |
| --- | --- | --- |
| 400,275 | Vogel | Mar. 26, 1889 |
| 1,128,445 | Henning | Feb. 16, 1915 |
| 2,215,585 | Huenlich | Sept. 24, 1940 |
| 2,252,185 | Kluse et al. | Aug. 12, 1941 |
| 2,294,499 | Henkell et al. | Sept. 1, 1942 |